(12) United States Patent
Freitag et al.

(10) Patent No.: US 9,127,936 B2
(45) Date of Patent: Sep. 8, 2015

(54) CALIBRATION OF LASER LIGHT SECTION SENSORS DURING SIMULTANEOUS MEASUREMENT

(75) Inventors: Stefan Freitag, Sauerlach (DE); Albert Sedlmaier, Miesbach (DE); Udo Lang, Rosenheim-Aising (DE)

(73) Assignee: Data M Sheet Metal Solutions GmbH, Valley (DE)

( * ) Notice: Subject to any disclaimer, the term of this patent is extended or adjusted under 35 U.S.C. 154(b) by 113 days.

(21) Appl. No.: 13/981,718

(22) PCT Filed: Jan. 25, 2012

(86) PCT No.: PCT/EP2012/051129
§ 371 (c)(1),
(2), (4) Date: Oct. 2, 2013

(87) PCT Pub. No.: WO2012/101166
PCT Pub. Date: Aug. 2, 2012

(65) Prior Publication Data
US 2014/0029018 A1    Jan. 30, 2014

(30) Foreign Application Priority Data

Jan. 25, 2011   (DE) .................... 10 2011 000 304

(51) Int. Cl.
*G01B 11/24* (2006.01)
*G01B 11/245* (2006.01)
*G01B 11/25* (2006.01)

(52) U.S. Cl.
CPC .............. *G01B 11/24* (2013.01); *G01B 11/245* (2013.01); *G01B 11/2504* (2013.01); *G01B 11/2518* (2013.01)

(58) Field of Classification Search
USPC .............. 356/601–625; 250/559.29; 345/419, 345/426, 427, 629; 382/141, 145, 154
See application file for complete search history.

(56) References Cited

U.S. PATENT DOCUMENTS 5,196,900 A * 3/1993 Pettersen .................... 356/141.4
5,712,803 A * 1/1998 Garuet-Lempirou ......... 702/158
(Continued)

FOREIGN PATENT DOCUMENTS

DE    69003090    2/1994
DE    10017463    10/2001
(Continued)

OTHER PUBLICATIONS

PCT/EP2012/051129 Search Report of the international search authority, May 2012.

*Primary Examiner* — Sang Nguyen
(74) *Attorney, Agent, or Firm* — Nathan & Associates Patent Agents Ltd.; Menachem Nathan

(57) ABSTRACT

Method for measuring an extruded profile using a measuring apparatus, wherein the measuring apparatus is designed to produce and measure at least two laser light sections on a surface of the profile, which is being pulled through the measuring apparatus, by means of at least one laser light section sensor from a respective, different position around the profile, wherein the at least two laser light sections are situated essentially in one plane. By positioning at least two references and/or reference markers from the adjacent positions together with the extruded profile in a respective common measurement capture area, said references or reference markers are used for calibration of respective raw image of the at least one laser light section sensor. Thus, the calibrated raw image data are correctly mapped in a common coordinate system from the respective position.

20 Claims, 5 Drawing Sheets

(56) References Cited

U.S. PATENT DOCUMENTS

| | | | |
|---|---|---|---|
| 6,078,846 A * | 6/2000 | Greer et al. | 700/174 |
| 6,205,240 B1 * | 3/2001 | Pietrzak et al. | 382/152 |
| 6,909,513 B1 * | 6/2005 | Fujita et al. | 356/601 |
| 6,975,964 B2 * | 12/2005 | Reichler et al. | 702/182 |
| 7,065,462 B2 * | 6/2006 | Merrill et al. | 702/95 |
| 7,679,757 B1 | 3/2010 | Harris et al. | |
| 2003/0127588 A1 | 7/2003 | Martinez | |
| 2004/0202364 A1 | 10/2004 | Kochi et al. | |
| 2005/0226489 A1 * | 10/2005 | Beach et al. | 382/141 |
| 2008/0033410 A1 * | 2/2008 | Rastegar et al. | 606/9 |
| 2009/0097039 A1 | 4/2009 | Kawasaki et al. | |
| 2009/0100900 A1 * | 4/2009 | Spalding | 73/1.81 |
| 2011/0298916 A1 * | 12/2011 | Arden | 348/86 |

FOREIGN PATENT DOCUMENTS

| | | |
|---|---|---|
| DE | 10328523 | 1/2005 |
| DE | 10335472 | 2/2005 |
| EP | 1580523 | 9/2005 |
| WO | 9208103 | 5/1992 |
| WO | 2005106384 | 11/2005 |

* cited by examiner

CALIBRATION OF LASER LIGHT SECTION SENSORS DURING SIMULTANEOUS MEASUREMENT

The present invention refers to a method and a device for measuring an extruded or sheet-metal profile with simultaneous calibration of laser light section sensors in relation to each other according to claim 1 or claim 16 and 17, respectively. For this purpose, several laser light section sensors and references/reference markers are arranged, preferably on a circular device, around, for instance, an extruded or sheet-metal profile to be measured continuously so that the extruded or sheet-metal profile and the references/reference markers can be measured simultaneously. In this manner, it is possible to easily re-calibrate the laser light section sensors during a production process.

STATE OF THE ART

DE 103 28 523 describes a method and a measuring device for contactless measurement of the surface contour of a test sample according to a laser-based light section method (triangulation principle), such as for contactless measurement of a rail profile for railroads. With this method, for the purpose of calibration, several reference markers between the rail profile and the respective sensor are arranged in a laser line which is projected onto the rail profile by light section sensors, the reference markers being positioned on one plane and being spaced at a defined distance from each other. Subsequently, the reference markers measured by means of the camera system are used for calculating a transformation matrix so as to rectify the image of a measurement line of the rail profile. The precise adjustment of the reference markers lying on one plane into the plane of an emitted laser-beam bundle, however, is difficult and only intended for an fixed assembly of the light section sensors and the reference markers.

U.S. Pat. No. 7,679,757 describes a device and a method for contactless measurement of a surface contour according to the laser-based light section method, for instance of an extruded profile which is pushed through a sensor device. The sensor device allows thereby the measurement of the surface of the extruded profile during production so that the production parameters can be accordingly readjusted during the production process. One or more sensors are mounted thereby on an annular device so that the bar or rail profile can be measured from all sides according to its surface. The sensors are arranged thereby radially along a circular arc and directed inwardly towards the extruded profile. At times, calibration of the sensor device takes place by introduction of a special calibration body; however, this cannot take place during a production process.

DE 100 17 463 describes a device and a method for the contactless measurement of a surface contour according to the laser-based light section method, where the object to be measured is simultaneously measured with stationary reference markers. The image of the object to be measured and simultaneously of the stationary reference markers is thereby recorded by means of a semitransparent mirror. During this process, the stationary reference markers are to be kept in a defined and constant spatial relationship to the sensors.

DE 690 03 090 describes a device and a method for the calibration of a movable laser light section sensor which is mounted, for instance, on a robot arm and moved around a test specimen for measurement purposes. For calibration, a defined calibration object of known dimensions is placed in a defined position in space and scanned so as to produce, from these measured values, a correction matrix for rectification, i.e. correction, of the measurement results. During the calibration, however, the laser light section sensor must be moved towards the calibration object and is not available for measurements of the test specimen during this time. For this time, the calibration object and the robot arm must be maintained at a defined spacing.

U.S. Pat. No. 7,679,757 B1 describes a 360 degrees-measurement system, consisting of laser light section sensors which are arranged circularly e.g. around an extruded profile and measure the same. The measurement system can be calibrated by a calibration object which is introduced for a short time into the center of the common measurement area. On the other hand, the measurement system is also adapted for recognizing a known profile and outputting allocated measured values accordingly.

US 2004 0 202 364 A1 describes a calibration object and a reference object, respectively, and a method for the three-dimensional calibration of a measurement system, consisting of a stereophotography unit which is moved around the measurement object together with the calibration object arranged in the image. The calibration object or reference object, respectively, has a plurality of reference points at least six of which can be seen at a time from each lateral position.

It is desirable for measuring e.g. extruded profiles or other profiles which are continuously produced and pushed out of a roll-profiling plant to guide them through a measuring device of laser light section sensors during the production process for the purpose of continuous measurement of their surfaces. In this manner, using the measurement results, parameter corrections can be immediately performed in the roll-profiling plant. Further, a once established precision of the measuring device, which is substantially affected by changes in temperature, vibrations and mechanical impacts, is to be maintained with certain tolerances.

It is also desirable for measuring e.g. the extruded profile to measure all sides of the extruded profile and of all essential surfaces and curvatures, for which purpose either several sensors or at least one movable, traveling sensor must be provided, for instance on a circular arrangement. The sensor or sensors are to remain as low-cost as possible and are supposed to deliver precise measurement results in spite of variations in temperature. Temperature variations result mainly in offsets of the measurement results and not so much in scaling errors, caused mainly by an angular shift of a laser beam bundle due to temperature. As is well-known, the required precision is ensured by periodical calibrations over time. For this purpose, however, the calibration is advantageously supposed not to interrupt the production process.

Therefore, it is an object of the present invention to provide a method and a measuring device based on a laser light section measurement method for continuously measuring a surface of a test specimen guided through the measuring device, such as e.g. an extruded profile, where during measurement of the test specimen also periodic calibrations can be performed without stopping or braking the production process for this purpose.

Another object of the present invention is to make the measuring device measure the surface of the specimen, e.g. of the extruded profile passing through it, preferably from all sides or parts thereof.

Another object of the present invention is to preferably be able to use laser light section sensors as simple and inexpensive as possible and to largely compensate for temperature and material extension variations by suitable calibration so as to remain within the required measurement tolerances.

DISCLOSURE OF THE INVENTION

The above-mentioned objects as well as other objects to be found in the description are achieved by a method and a measuring device for the continuous measurement of extruded profiles with simultaneous periodical re-calibration according to the independent claims 1 or 16 and 17, respectively.

Advantageously, by the arrangement and by the simultaneous measurement of the references or reference markers with the extruded profile, a calibration of the raw image data from the second position becomes possible with reference to the raw image data from the first position without e.g. interruption of continuous measurement of an extruded profile being necessary. The arrangement of reference markers in an outer area of the common measurement region of adjacent laser light section sensors is simply possible without any shading of the extruded profile which is preferably arranged at the center of the measuring device. Advantageously, an absolute position of the reference markers has no influence on the measuring result. Instead of additional reference markers introduced in the measurement area, references, if such exist in the extruded profile, can also be used, whereby the measurement area is not limited, as no shading is induced, and allowing however a calibration of the laser light section sensor in a position with reference to the neighboring position. With this kind of calibration, influences of temperature and aging on a mechanical structure or on one of the laser light section sensors of the measuring device, which cause an offset of the measured values, can easily and almost continuously be compensated for by means of calculation.

Other advantageous embodiments of the invention are indicated in the dependent claims.

A preferred embodiment of the present invention is presented in the subsequent drawings and in a detailed description, but the same are not intended to limit the present invention.

SHORT DESCRIPTION OF THE DRAWINGS

DETAILED DESCRIPTION OF AN EXEMPLARY EMBODIMENT

Figure 1:
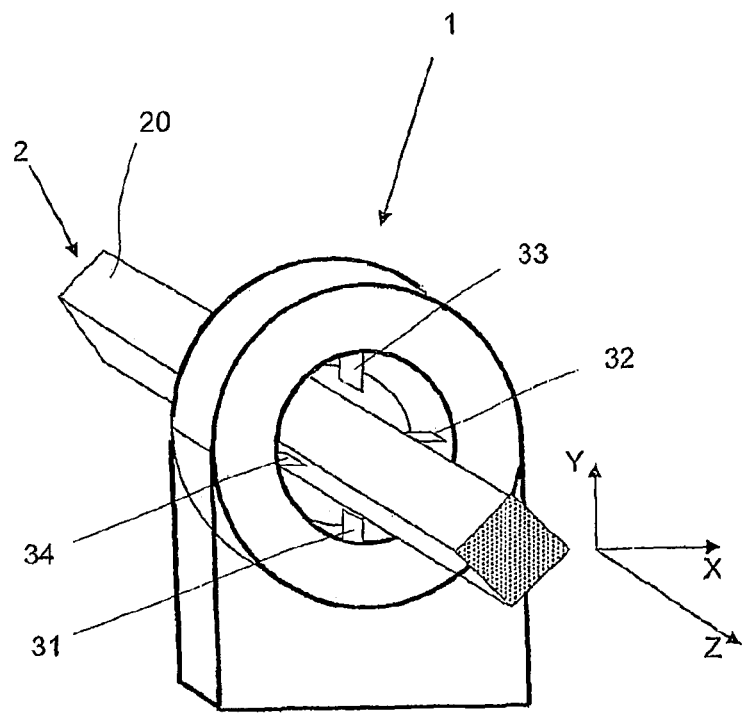
FIG. 1 is a perspective view of a measuring device based on the laser light section method for measuring the surface of an extruded profile which is pushed from a roll-forming device through the measuring device.

FIG. 1 shows a three-dimensional view of a preferred measuring device 1 for measuring a test specimen and in particular an extruded profile 2 which is guided through the measuring device 1. In the measuring device 1, several or at least one movable, controllable laser light section sensor S1-S4 are arranged preferably on a circular device 11 around the extruded profile 2 such that they are oriented towards the center where the extruded profile 2 is located in order to fully or partially measure the surface 20 of the extruded profile 2 as its cross-section.

When for measuring the extruded profile, preferably several laser light section sensors S1-S4 are employed on the circular device 11, their respective precise position first does not need to be known, since the precise mutual positions can later be calculated by calibration. An arrangement of the laser light section sensors S1-S4 along the circular device 11 (FIG. 2) takes place such that an as large as possible part or an as relevant as possible part of the surface 20 of the extruded profile 2 is measured by the laser light section sensors S1-S4. The number and arrangement of the laser light section sensors S1-S4 is determined by this.

The recording of the surface 20 by the laser light section sensors S1-S4 takes place such that the respective laser light section sensor S1-S4 emits a laser light bundle which lies in one plane and which is projected onto the surface 20 of the extruded profile 2 as a laser light section, and in turn measures its reflected light. During this process, the laser light sections are preferably generated such that they are substantially located in one common plane or such that their respective laser light section planes are shifted in parallel by one to three widths of a laser beam bundle so that they just barely do not interfere with each other for a measurement. Preferably, the common plane of the laser light sections is embodied so as to extend substantially perpendicularly to the extruded profile (2).

In a different preferred embodiment of the measuring device 1, which comprises only one or a few laser light section sensors, they can be moved in a specific position in a controlled manner on the circular device 11, so that the extruded profile 2 can be recorded from all sides for measurement of its surface 20. During this process, the pivot point and the pivoting position of the laser light section sensors are known and remain stable.

In a different preferred embodiment of the measuring device 1, an arrangement of several laser light section sensors can be moved together on the circular device 11 by an angle phi so as to generate a different illumination or a different measurement area and to better detect undercuts of a profile.

For calibration purposes, reference markers 31-34 are arranged in the measuring device 1 shown in FIG. 1 in the interior between the laser light section sensors S1-S4 and the extruded profile 2, which reference markers are described in more detail in the following as regards the reference markers per se and their arrangement. In the preferred embodiment, the reference markers 31-34 are constantly installed in the measuring device 1 in such a way that they shade as little of the extruded profile 2 to be measured as possible.

Figure 3:
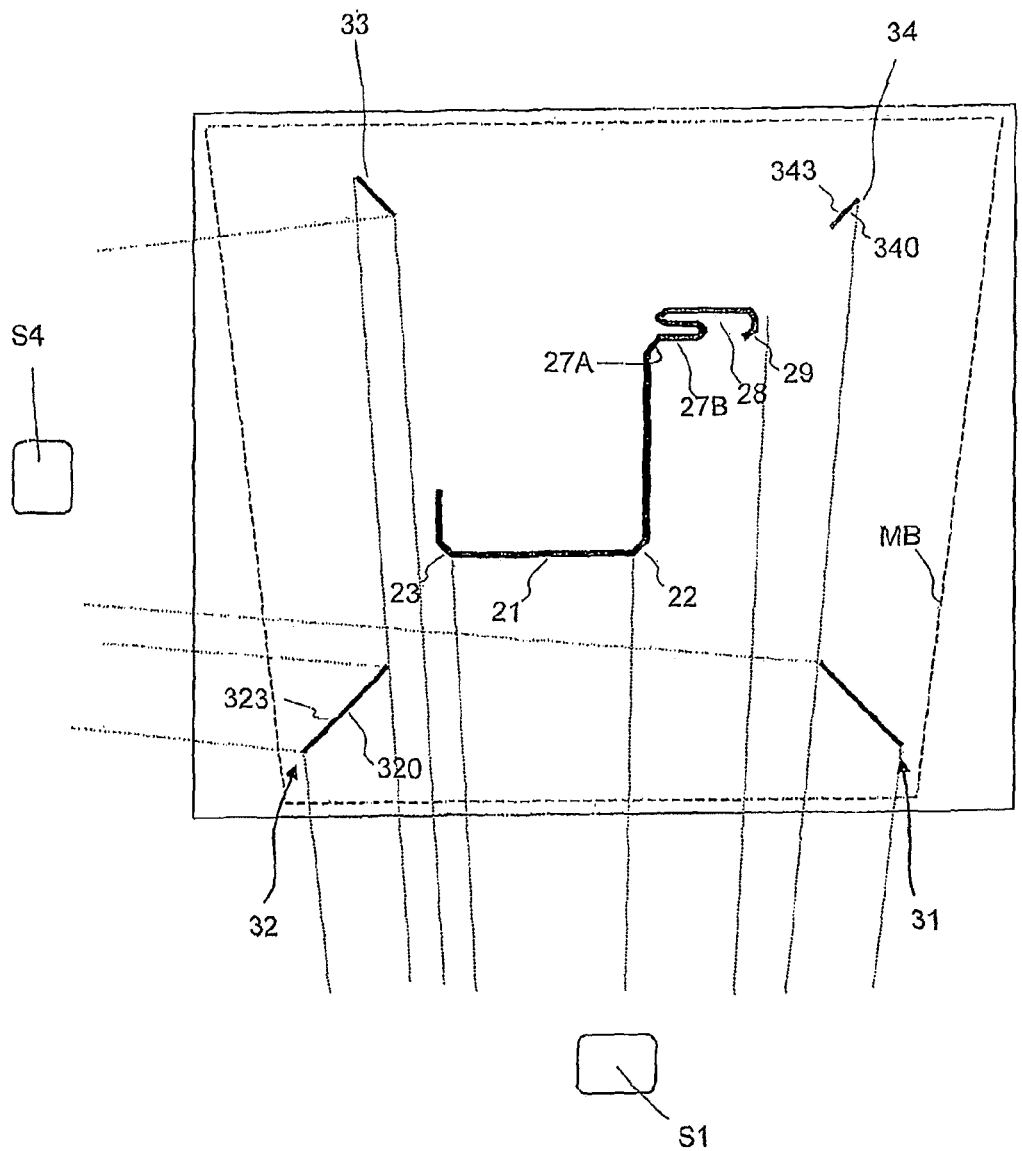
FIG. 3 shows the cross-section of the extruded profile, different from the one in FIG. 2, with four reference markers arranged around it and with indicated optical paths from a first measuring perspective of the corresponding laser light section sensor.
Figure 4:
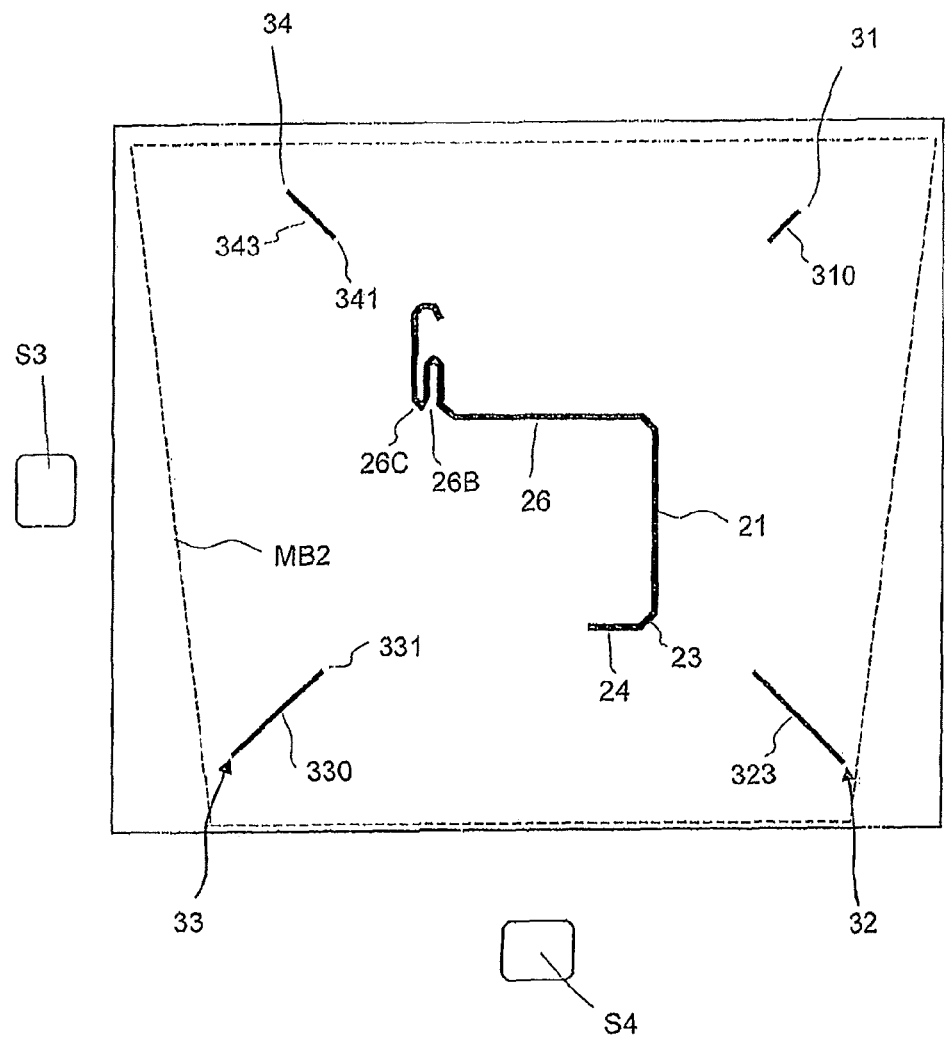
FIG. 4 shows the cross-section of the extruded profile with the reference markers around it and with the optical paths from a second measuring perspective of the corresponding laser light section sensor.

By guidance of the extruded profile 2 through the measuring device 1 in the Z-direction and measurement preferably taking place from all sides, the extruded profile 2 can nearly be measured as a 3D surface profile. If parts of the surface profile 20 of an extruded profile 2 are shaded, as shown in FIGS. 3 and 4, these parts cannot be measured by laser light section sensors S1-S4.

For definition purposes, a coordinate system is drawn in FIG. 1. The extruded profile 2 measured by the laser light section sensors is located thus on the X-Y plane, with measurement of the illuminated outer edges being possible. By the guidance of the extruded profile 2 through the measuring device 1 with nearly continuous measurement, a three-dimensional surface image of it is produced.

Figure 2:
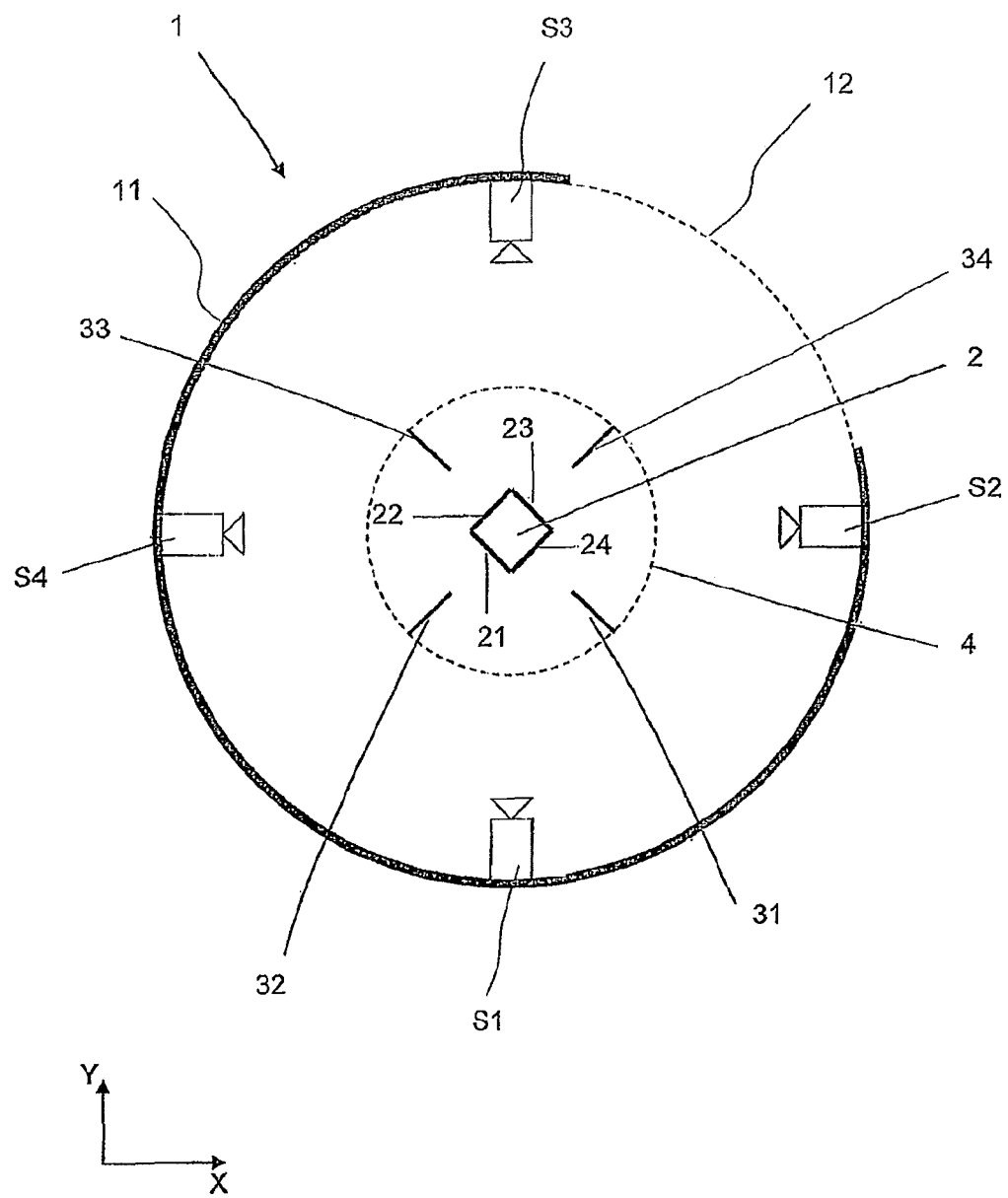
FIG. 2 is a schematic view of the measuring device for measuring the surface of the extruded profile in which four laser light section sensors are arranged in an incremental angle of 90 degrees along a circular ring around the cross-section of the extruded profile and directed towards the inside.

FIG. 2 shows a schematic lateral view of a preferred embodiment of the measuring device 1, comprising the circular device 11 with four laser light section sensors S1-S4 arranged on it and an annular arrangement with four reference markers 31-34 at the edge of a preferably common measurement area of the laser light section sensors S1-S4. The extruded profile 2 to be measured is located at the center of the measuring device 1 and in the measurement section, the extruded profile 2 being represented as a cross-section with the surface segments 21-24-directed outwards. The surface segments 21-24 substantially form the surface 20 of the extruded profile 2 if there are no shadings (which is not the case in this example). The reference markers 31-34 are preferably embodied as metal strips and are arranged to be directed radially inwards at an external area 4 of the common measurement area, so that the extruded profile 2 is not covered by them on the one hand and, on the other hand, such that they are all located at least partially in the measurement area of all laser light section sensors S1-S4.

In the preferred embodiment, the circular device 11 on which the laser light section sensors S1-S4 are arranged has an opening 12 through which an extruded profile can be inserted also from the side. This opening 12, however, is not indispensable since the extruded profile 2 can be continuously guided through the measuring device 1 without the necessity of removing in the mean time the extruded profile 2 for calibration purposes and then re-inserting it. In a preferred arrangement of the measuring device 1, it can be arranged, for instance, at one end of a roll-profiling device or at a different production plant for manufacturing of the extruded profile 2.

According to the present invention, the calibration of the measuring device with the corresponding laser light section sensors S1-S4 is preferably carried out, such that existing references in the extruded profile 2 to be measured and additional reference markers 31-34, which are recorded by the laser light section sensors S1-S4 in common from the different measuring perspectives, are used for overlapping recorded image data of the respective laser light section sensors S1-S4 which have at least two references or reference markers in common. The overlapping of the image data by rotation and shifting in the x/y direction is performed such that the references and the reference markers 31-34 optimally overlap each other. For a calculation of the optimal overlap, preferably a least mean square method is used from which a corresponding transformation matrix for the correction and the optimum combination of the image data is calculated. With the transformation matrix, raw image data of the respective laser light section sensor S1-S4 are concerted into calibrated image data which are then mapped in a common coordinate system in a correct, i.e. calibrated, manner.

As references in the extruded profile 2 and as reference markers 31-34, preferably shapes such as straight lines, circles and/or circular segments can be used which can and must be recorded from at least two measuring perspectives. If in the extruded profile 2, for instance, straight segments are present at a respective angular position, which segments can be recorded from at least two measuring perspectives, these can be used as references. Otherwise, as described above, the reference markers 31-34 are additionally entered in a common measurement recording region covered by at least two laser light section sensors, which however can advantageously be integrated in the common measurement recording region, anyway. For the common measurement region, preferably a periphery 4 is thereby selected which in FIG. 2 is drawn as a dotted line and which is just barely recorded by the neighboring laser light section sensors S1-S4. A shape and a thickness of the reference markers 31-34 are preferably thereby known. To shade the inner measurement recording region as little as possible, where the extruded profile to be recorded is located, the reference markers 31-34 are preferably embodied as thin, sheet-like strips which in the periphery 4 are preferably distributed evenly as four reference markers 31-34 and directed radially inwards.

Spacings of the references and the reference markers 31-34 from each other do not necessarily have to known as long as they can be unambiguously allocated from the different measuring perspectives or from the measuring data of the corresponding laser light section sensors S1-S4, respectively.

For an offset correction of the respective laser light section sensors S1-S4, at least two respective references or reference markers are required which can be recorded in common by the adjacent laser light section sensors S1-S4. As adjacent references and reference markers S1-S4, preferably such markers are suited which have a non-parallel straight shape since the straight shape is well recognized by pattern recognition methods and can be unambiguously extrapolated. By means of two non-parallel straight lines and a calculated intersection point of the straight lines, the angular position and the distance from the respective laser light section sensor S1-S4 can be unambiguously determined and corrected during calibration. Ideally, an additional reference marker is recorded by two neighboring laser light section sensors S1-S4, which reference marker is located as far away as possible from the other two reference markers, so as to reduce an influence of measurement noise and to increase the precision of localization and overlapping of the reference markers 31-34.

At this point, it is again to be noted that a temperature influence on the laser light section sensors S1-S4 and aging mainly have an effect on their offset of the raw image data, with scaling of the measurement and raw image data remaining substantially unchanged. Therefore, for calibrating the offset, only two straight line sections in the entire measurement recording region are required as references or reference markers 31-34 for determining the rotation angle and the shifting with respect to the common coordinate system.

For complete calibration of the offset and the scaling, at least three references or reference markers 31-34 in the respective common measurement recording region are necessary whose mutual spacings are known and calibrated. In this manner, incremental errors can also be reduced.

Preferably, for an adjustment of neighboring laser light section sensors S1-S4, at least two respective reference markers 31-34, which can be recorded in common and which have the form of sheet-metal strips and whose dimensions as straight lines or sections of straight lines that can be recorded well, are used for defining the transformation matrix.

Preferably, the reference markers 31-34 are embodied such that at least one of them has an encoding so that in the image data, at least one such encoding can be identified for obtaining an unambiguous allocation of the reference markers in the different image data so that they in turn can be calibrated correctly. Such an encoding can be provided e.g. by an additional curvature or edge on a reference marker, or the reference marker 31-34 can clearly have a different orientation than the others. Alternatively, for a correct orientation or rotation of the raw image data or the image data in the coordinate system, rough positions of the laser light section sensors S1-S4 can be known so that an allocation can take place via a calculation of minimal spacings, for instance by the least mean square method. In addition, significant references in the extruded profile 2 can also be used to find the allocation of the reference markers 31-34.

FIG. 2, for instance, shows the measuring device 1 where for adjustment and calibration, e.g. between the laser light section sensor S1 and the laser light section sensor S2 all reference markers 31-34 can be used. The laser light section sensor S1 records the reference markers 31 and 32 entirely and the reference markers 33 and 34 partially. The laser light section sensor S2 records the reference markers 31 and 34 entirely and the reference markers 32 and 33 partially. Here it is noted that for overlapping of the reference markers 31 and 33 from these perspectives, the thickness of the reference markers 31, 33 is included in the calculation. At the same time, the surface segment 24 can additionally be used as a reference between the laser light section sensors S1 and S2. This method applies similarly for the adjustment and the calibration between other laser light section sensors S1-S4 from the respective measurement perspectives.

FIG. 3 shows the measurement recording region (MB) of the laser light section sensor S1 as a dashed line and an extruded profile 2 located below it, different from the extruded profile shown before, with the reference markers 31-34 as they are recorded by the laser light section sensor S1. This means that from the rear reference markers 33 and 34, only a part can be seen since the other part is shaded by the front reference markers 33 and 32. In this preferred embodiment, the reference markers 31-34 are also arranged as thin platelets on the periphery 4 of the measurement recording region MB, oriented radially inwards toward the center of the measurement recording region MB. It is to be noted that, other than what is shown, not the entire surface of the extruded profile 2 can be recorded by the laser light section sensor S1-S4, but only parts thereof. For instance, the laser light section sensor S1 records in particular the surface segments 23, 21, 22, 27A and 27B entirely and 28 and 29 only partially.

In the represented case, both all reference markers 31-34 and the surface segments 23 are suitable as a reference for a calibration between the laser light section sensor S1 and the laser light section sensor S4, which reference, however, is relatively small. The longer the time during which a straight-line reference or a reference marker 31-34 can be recorded, the higher the precision because many measurement points are available for calculation of a straight line.

In this example, the laser light section sensor S1 records the reference marker 32 from one side 320 and continues it as a straight line which transitions into the straight line section of the reference marker 34 with its side 340, thus forming a long straight line with high measurement precision. The laser light section sensor S4 also records the reference markers 32 and 34 and makes them form a straight line, however from a second side 323 or 343, respectively. Taking into account the thickness of the reference markers 32 and 34, these two straight lines are then caused to overlap by means of the corresponding image data. The same applies for the reference markers 31 and 33 which are also recorded by both laser light section sensors S1 and S4, adapted to form straight lines and caused to overlap in the respective image data.

As mentioned above, the surface segment 23 can also be used as a reference straight line for determining the best overlap of the image data of the laser light section sensors S1 and S4.

Thus, the preferred method for calibration detects from the image data of the respective laser light section sensor S1-S4 existing straight lines, tries to define them as well as possible by means of as many measurement points as possible and to identify them in a comparison with the image data of the other laser light section sensors S1-S4. After the identification, the matching and the optimum mutual overlapping of the respective image data take place. In this process, for calibration, the respective transformation matrices of the image data for calibrated coordinates are defined and applied to the subsequent other image data so that all lateral views from the different measurement perspectives of the employed laser light section sensors S1-S4 or additional ones are matched each other in a coordinate system.

At this point, it is to be noted that all of this also works with only one laser light section sensor S1 which however must preferably be able to move about a constant pivot point and about reproducible angles on a circular path so as to record the image data from the various perspectives, unless a new calibration has to take place with each measurement from each position of the laser light section sensor S1, which only uses up computing time. In case of an extruded profile 2 moved continuously through the measuring device 2, of course the extruded profile 2 could not be recorded in terms of measurement simultaneously from all sides.

FIG. 4 shows the same arrangement of the extruded profile 2 within a second measurement recording region MB2 with the respective reference markers 31-34, however from a different measuring perspective from the laser light section sensor S4. It can be seen that the measuring perspective of laser light section sensor S4 complements the image data of extruded profile 2 by those of the surface segments 24, 23, partly 26, 26B and 26C, in addition to the image data from the measuring perspective of laser light section sensor S1.

During the calibration, the reference marker 33 is recorded through the side 330, reference marker 32 through the sided 323, reference marker 34 partly through the side 343 and reference marker 31 partly through the side 310.

During the calibration of the laser light section sensor S4, the transformation matrix for this laser light section sensor S4 is determined, from the image data measured during this process, in such a way that the positions and line paths of the reference markers 31-34 contained therein are optimally matched with the previously measured positions and line paths of the reference markers 31-34 from a first measuring perspective, e.g. from the laser light section sensor S1.

The calibration of the additional laser light section sensors S1-S4 from the corresponding additional measuring perspectives is done similarly.

Figure 5:
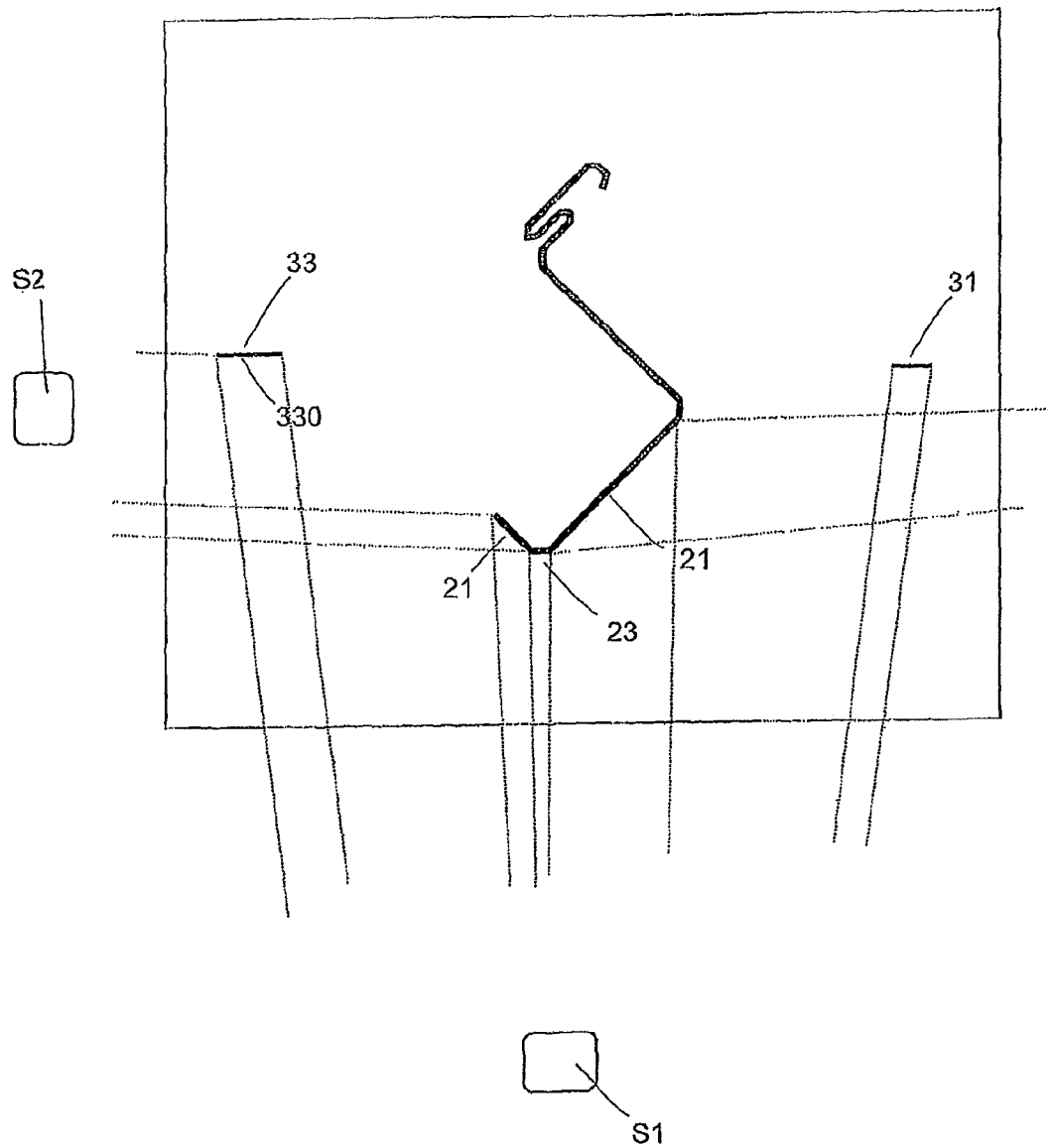
FIG. 5 shows the cross-section of the extruded profile with the reference markers around it and with the optical paths from a further measuring perspective of the corresponding laser light section sensor.

FIG. 5 shows an additional measuring perspective of the extruded profile 2 from an additional view of a laser light section sensor rotated to the right by 45 degrees. It becomes clear that the surface segment 23 of the extruded profile 2 can be measured better or more precisely, in particular its corners. The thinly dotted lines indicate beam paths of the laser light section sensor turned to the right. Thereby either one or more additional light section sensors can be used, or the laser light section sensors S1-S4 already used in the measuring device 1 can rotationally travel and be moved back for the time period of the measurement in their entirety. The rotatory travel position of the laser light section sensors S1-S4 can be determined from the arrangement as well as, during calibration, from the reference markers 31-34 and from references in the extruded profile so that the measurement and image data of the extruded profile 2 (and of the reference markers 31-34) taken from the corresponding measurement perspective are positioned correctly in the coordinate system by means of the respective, a newly determined transformation matrix.

For the sake of clarity, it is again pointed out that the references and the reference markers 31-34 do not need to have any known, defined mutual spacings and thus no known positions; they only have to be located in the common measurement recording regions of the laser light section sensors S1-S4. The number of laser light section sensors S1-S4 to be adjusted and calibrated with each other is arbitrary as long as the condition of common recording of references and/or reference markers 31-34 described above is fulfilled. It should also be thereby clear that under certain circumstances, not even reference markers 31-34 are necessary for calibration, if there are sufficient references in the extruded profile 2 fulfilling the condition that at least two references are recorded together by respective neighboring laser light section sensors S1-S4; this is the case, for example, with extruded profiles 2 with an evenly distributed octagon cross-section and with evenly distributed 8 laser light section sensors S1-S4.

For clarity purposes, it is also pointed out that the number of references and reference markers 31-34 is arbitrary provided that the condition is fulfilled that at least two references or at least two reference markers 31-34 or at least one reference and one reference marker 31-34 are recorded together by mutually adjacent laser light section sensors S1-S4.

For the sake of clarity, it is further pointed out that, if the shape of the reference markers 31-34 is identical, their individual positions in the image data of the respective laser light section sensors S1-S4 must be roughly known so that the reference markers 31-34 can be unambiguously identified in the respective image data. It must not be possible to confuse the reference markers 31-34. Otherwise, at least one of the reference markers 31-34 visible in adjacent scans can be encoded for the unambiguous identification in the image data of the neighboring scans and/or the extruded profile itself can be used for identification.

For the sake of clarity, it is also pointed out that the laser light section sensors S1-S4 can be 2D as well as 3D sensors.

For clarity purposes, it is to be pointed out again that two kinds of calibration can be understood here. In general, calibration comprises a correction of the offset in the X and Y directions and of the rotation angle so that the image data of adjacent laser light sensors S1-S4 are optimally mapped in a common coordinate system using known or common references, such as e.g. reference straight lines. For this purpose, a transformation matrix for the respective laser light section sensor S1-S4 is calculated and then applied to the corresponding image data (for correction). If a sufficient number of references and reference markers 31-34 are available at a common recording by laser light section sensors S1-S4, or if calibrated reference markers 31-34 with defined, known spacings are available, the calibration can additionally comprise the correction of scaling. It shall be mentioned that a preferred method for the calibration of the scaling also comprises optimum averaging of the image data of the different light section sensors S1-S4, with the least mean square method being preferably used.

For clarity, it shall also be mentioned that the term "extruded profile" 2 stands for all kinds of test specimens to be measured, which can also be profiles, tubes or other objects alterable in length which are located in the measuring device 1 or guided through the measuring device 1.

For the sake of clarity, it is pointed out that the term "image data" substantially refers to calibrated image data gained from the raw image data by the application of a transformation matrix. For clarity purposes, it shall also be pointed out that the raw image data can also be pre-calibrated data which were calibrated with reference to the respective laser light section sensor S1-S4 and/or to the measuring device 1.

It is conceivable to perform, for each measurement, simultaneously a calibration with the determination of the corresponding transformation matrices for the individual laser light section sensors, or it is possible to perform a calibration and re-definition of the transformation matrices only with each $n^{th}$ measurement, or at defined time intervals. It is also conceivable that a calibration is made dependent on the temperature of the measuring device 1 or of the environment, on re-activation of the measuring device 1, on an operation time or on combinations thereof.

It is also conceivable for the reference markers 31-34 not to be permanently present in the measuring device 1 but to be only introduced into the measuring device 1 for the time of calibration.

It is also conceivable to use different reference markers 31-34 and/or a different arrangement thereof, depending on the extruded profile 2, in order to avoid shading of the extruded profile 2.

Furthermore, it is conceivable for the individual laser light section sensors S1-S4 to comprise lasers with different colors for simultaneous measurement. Otherwise, measurement will take place sequentially so that no mutual interference of measurements occurs. A sequential measurement preferably takes place by means of simultaneous measurement with adjacent laser light section sensors S1-S4 so as to record also the mutual offset of the laser lines thereof in the feed direction Z.

It is also conceivable that instead of the reference markers 31-34, laser points are projected onto the extruded profile 2 each of which is recorded by two adjacent laser light section sensors S1-S4 so that reference points for an allocation and for an offset correction of the respective image data are obtained. Since all laser points or reference points are emitted and can be measured simultaneously, it is also possible to perform an oscillation analysis of the extruded profile 2.

Further it is also conceivable that the unambiguous allocation of the reference markers 31-34 in the raw image data, if the reference markers 31-34 are not encoded for identification, is done so that the respective positions of the laser light section sensors S1-S4 are substantially known and the recorded and recognized reference markers 31-34 are located in a certain area with a certain fuzziness. For instance, one of the recognized reference markers 31-34 can be located in a defined position in the common coordinate system +/−2 cm.

It is also conceivable for the measuring device (1) to be shifted along the extruded profile (2), the relative movement between the measuring device (1) and the extruded profile (2) being the decisive factor.

Other possible embodiments are described in the following claims.

The reference numbers indicated in the claims are for better comprehensibility, but do not limit the claims to the embodiments represented in the figures.

LIST OF REFERENCE NUMBERS 1 measuring device
11 circular device
12 opening
2 extruded profile
20 surface of extruded profile
21-29 surface segments
3 reference marker
31 first reference marker
32 second reference marker
33 third reference marker
34 fourth reference marker
4 periphery
KS1 first camera viewing angle
KS2 second camera viewing angle MB measurement recording region
MB2 second measurement recording region
S1 first laser light section sensor
S2 second laser light section sensor
S3 third laser light section sensor
S4 fourth laser light section sensor
X, Y, Z, coordinate directions

The invention claimed is:

1. Method for measuring a sheet-metal or extruded profile with a measuring device which is adapted to generate and to measure at least two laser light sections on a surface of the extruded profile when the extruded profile is guided through the measuring device, the method comprising the steps of:
   a) arranging at least one laser light section sensor in a respective first and second position around the extruded profile, wherein the at least two laser light sections are generated within two respective laser light section planes that are offset in parallel from each other just so far to be measured independently from each other, the planes forming a common measurement recording region;
   b) measuring the laser light sections on the extruded profile from the respective first and second position using the at least one laser light section sensor thereby obtaining first position raw image data and forwarding the first position raw image data to a computing unit, wherein the first position raw image data are used as first position calibrated image data;
   c) arranging and measuring at least two references in the common measurement recording region from the first position and from the second position, wherein the respective reference is from the extruded profile or from a reference marker arranged between the respective position of the at least one laser light section sensor and the extruded profile;
   d) by the computing unit, determining a shift-and a rotation angle of the respective reference within second position raw image data at the second position with reference to the first position calibrated image data;
   e) by the computing unit, calculating a transformation matrix from the shifting and from the rotation angle determined in step d), and applying the transformation matrix to the second position raw image data to obtain second position calibrated image data, wherein the recorded references in the second position calibrated image data match the recorded references in the first position calibrated image data in a common coordinate system; and
   f) by the computing unit, outputting and using all calibrated image data in the common coordinate system to determine the extruded profile.

2. Method according to claim 1, further comprising: by the computing unit, repeating the sequence of steps (c) through (f) for all other raw image data of the at least one laser light section sensor in other adjacent positions up to a last adjacent position, starting from respective raw image data of a position adjacent to the position of the image data calibrated last, with these respective raw image data being calibrated each time with reference to the image data calibrated last.

3. Method according to claim 1, wherein the references are selected from the group consisting of planar surfaces, round surfaces, curved surfaces and combinations thereof, and wherein the planar, round or curved surfaces and combinations thereof are recorded as, respectively, straight lines, circles, segments of circles and combinations thereof in the extruded profile.

4. Method according to claim 1, wherein the reference marker is selected from the group consisting of a rod, a metal sheet and combinations thereof and wherein the rod, metal sheet and combinations thereof is imaged in the laser light section as respectively a circle, a straight lines and a segment of a circle.

5. Method according to claim 1, further comprising the step of, by the computing unit, encoding at least one of the reference markers and identifying the encoding in the respective raw image data and in the respective calibrated image data, wherein the encoding is embodied as an additional edge, a rounding or a different orientation of the reference marker.

6. Method according to claim 1, wherein the step of determining the shift and the rotation angle further includes extrapolating references recorded as having at least partial straight lines such that at least partially straight lines of the second position raw image data and of the first position calibrated image data represent at least two non-parallel straight lines that are correlated.

7. Method according to claim 1, wherein the step of determining the shift-and of the rotation angle takes place in such a way that several recorded and recognized references in the calibrated image data of neighboring laser light section sensors are caused to overlap according to a method of optimal matching.

8. Method according to claim 1, wherein the step of determining includes identifying and allocating the references using known mutual positions of neighboring laser light section sensors.

9. Method according to claim 1, further comprising the step of: by the computing unit, performing a scaling correction of the respective raw image data or of the respective calibrated image data, wherein the references have known mutual spacings or known lengths or widths.

10. Method according to claim 9, wherein the performing a scaling correction of the respective raw image data or of the calibrated image data includes integrating one or more references embodied as reference bodies with detectable widths, heights and depths into the common measurement recording region.

11. Method according to claim 1, wherein at least two of the laser section planes are generated by respective laser light section sensors and wherein at least two of the laser section planes are created by moving a laser light section sensor to the various positions so as to generate the respective raw image data from the respective measuring perspective and then to generate via the transformation matrix the calibrated image data.

12. Method according to claim 11, wherein the laser light section sensor is moved on a circular trajectory.

13. Method according to claim 1, wherein the step of arranging includes arranging the at least two laser light section sensors on a circular or U-shaped device such that the at least two laser light section sensors have a measurement recording region which is directed inwardly towards the extruded profile.

14. Method according to claim 1, wherein the step of measuring includes measuring substantially continuously the extruded profile and calibrating the laser light section sensors during each measurement at periodic intervals, at different temperatures, at the pressing of a button or using a combination thereof.

15. Method according to claim 1, wherein the-respective position raw image data are obtained by a 2D or 3D laser light section sensor.

16. Method according to claim 1, wherein the common measurement recording region extends perpendicularly to the extruded profile.

17. Measuring device for measuring an extruded profile, comprising:
 a) at least two laser light section sensors arranged on a circular device and oriented towards the extruded profile, each laser light section sensor having a respective common measurement recording region in common with an adjacent laser light section sensor, wherein each laser light section sensor is configured to generate a laser light section plane mutually offset in parallel from an adjacent laser light section plane of an adjacent laser light section sensor such as to be measured independently from each other, wherein each laser light section sensor provides respective raw image data;
 b) at least two references, the references present in the extruded profile or arranged between the at least two laser light section sensors and the extruded profile in the common measurement recording region; and
 c) a computing unit configured to:
   i. receive first raw image data from a first laser light section and second raw image data from a second laser light section,
   ii. use the first raw image data as first calibrated image data,
   iii. detect a respective reference within the first and the second raw image data,
   iv. determine a shift and a rotational angle deviation of the respective reference between the first and the second raw image data, and
   v. determine and apply a transformation matrix for the second raw image data to obtain calibrated second image data, such that the respective reference of the first raw image data or the first calibrated image data has the same coordinates within the calibrated second image data in a common coordinate system, and
   vi. determine the extruded profile.

18. Measuring device according to claim 17, wherein each at least one laser light section sensor is arranged movably on the circular device and is adapted to—assumes several positions in succession, wherein the respective measurement recording region of the at least one laser light section sensor at a specific position has a measurement recording region in common with the measurement recording region at an adjacent position, and wherein the at least one laser light section sensor provides the first raw image data from a first position and the second raw image data from a second position.

19. Measuring device according to claim 18, wherein the computing is arranged either in the respective laser light section sensor or as a separate unit.

20. Measuring device according to claim 17, wherein the computing unit is included either in the respective laser light section sensor or as a separate unit.

\* \* \* \* \*